United States Patent [19]
Eshoo

[11] 4,326,681
[45] Apr. 27, 1982

[54] NON-RIGID AIRSHIP

[76] Inventor: Fredrick Eshoo, 66 Cleary Ct., Apt. 1304, San Francisco, Calif. 94109

[21] Appl. No.: 77,188

[22] Filed: Sep. 20, 1979

[51] Int. Cl.³ .............................................. B64B 1/58
[52] U.S. Cl. .................................. 244/30; 244/23 C; 244/97; 244/128
[58] Field of Search .................... 244/23 C, 24, 25, 26, 244/27, 28, 29, 30, 31, 96, 97, 98, 125, 128

[56] References Cited

U.S. PATENT DOCUMENTS

| | | | |
|---|---|---|---|
| 1,027,590 | 5/1912 | Bucher | 244/30 |
| 1,451,503 | 4/1923 | Goetz | 244/29 |
| 1,546,803 | 7/1925 | Sternberg | 244/31 |
| 3,620,485 | 11/1971 | Gelhard | 244/29 |
| 4,114,837 | 9/1978 | Pavlecka et al. | 244/26 |

FOREIGN PATENT DOCUMENTS

| | | | |
|---|---|---|---|
| 215774 | 9/1908 | Fed. Rep. of Germany | 244/30 |
| 2327922 | 5/1977 | France | 244/23 C |
| 12247 | of 1908 | United Kingdom | 244/30 |

*Primary Examiner*—Charles E. Frankfort
*Attorney, Agent, or Firm*—Hill, Van Santen, Steadman, Chiara & Simpson

[57] ABSTRACT

A lighter-than-air saucer or disc-shaped non-rigid airship is disclosed. A saucer-shaped flexible envelope is provided within which an annular pressurized tube is positioned so as to maintain the flexible envelope in a saucer shape when inflated. Walls within the envelope from a central chamber and a plurality of outer chambers symmetrically disposed around the central chamber. Typically a load such as a gondola is suspended beneath the central chamber. To maintain level horizontal flight stability, differential forces are developed by preferably providing the central chamber with heated air and the outer chambers with a lighter-than-air gas such as helium providing greater lift than the central chamber. Propulsion units are preferably arranged at opposite peripheral side edges of the envelope and maneuvering of the saucer-shaped airship is accomplished by rotating the airship.

8 Claims, 11 Drawing Figures

FIG. 2
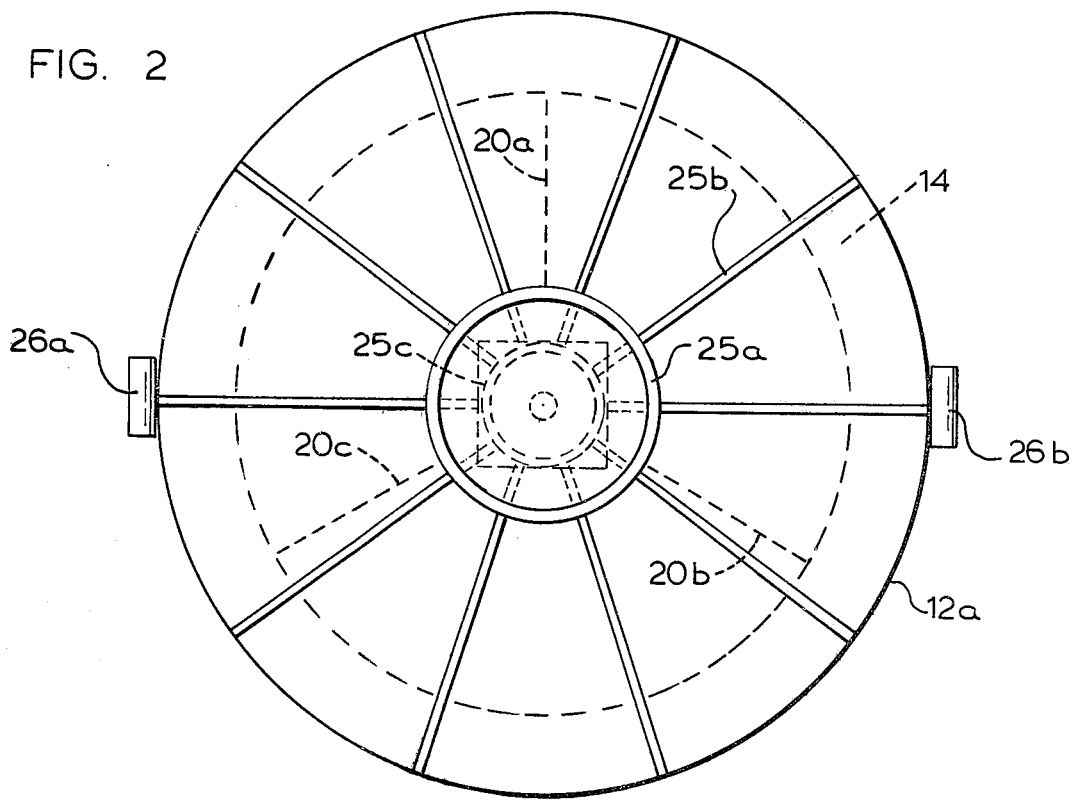
FIG. 4
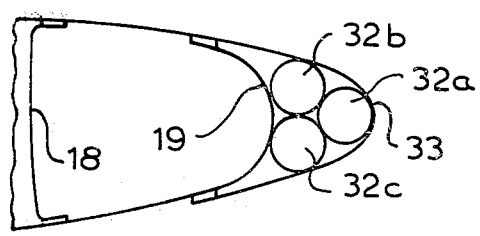
FIG. 5
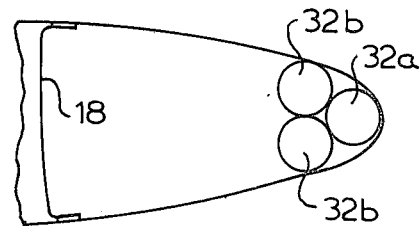
FIG. 6  $T_1 \gg T_2$
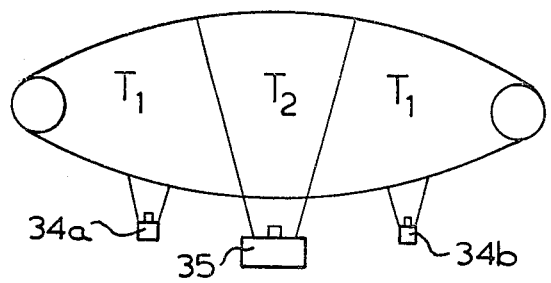
FIG. 7  $T_1 \gg T_2$
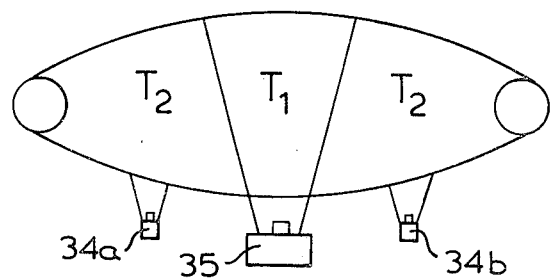
FIG. 8
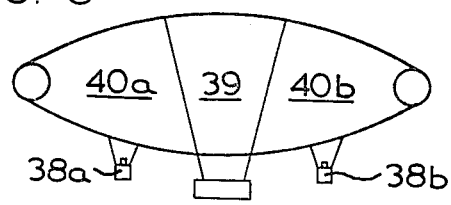
FIG. 9
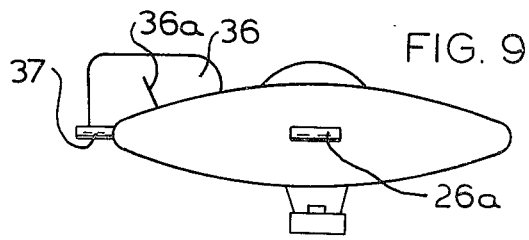

NON-RIGID AIRSHIP

BACKGROUND OF THE INVENTION

Non-rigid and/or lighter-than-air airships are known such as gas balloons which have been provided in many shapes and sizes. Known designs are extremely bulky and have considerable drag if the motor is used for lateral propulsion. It would be advantageous to build a gas balloon or other type of airship which is more suited by its shape to be propelled with less drag. Such a shape would be streamlined by comparison with known balloon shapes and is preferably, therefore, of small dimensions in one coordinate direction such as a thin cross-section. It is, however, very difficult to construct from a soft fabric a balloon which will retain such a shape when inflated. More particularly, if the shape chosen is that of a disc or "flying saucer" shape, it is difficult to maintain a thin cross-section when the envelope is inflated.

It has also been previously known to provide lighter-than-air airships which can be propelled in a given direction and which are streamlined to promote propulsion in a given direction but which have fins or other guide surfaces to maintain stability. If a turn to the left or right is desired, it is usually necessary to bank one fin lower than the lower to initiate a turn. Consequently, sharp turns cannot be achieved.

It is known that a "flying saucer" shape is a desirable shape since it is streamline in all horizontal directions. However, up until now it has not been known how to maintain such a saucer-like shape in level flight.

SUMMARY OF THE INVENTION

It is an object of this invention to provide a saucer-shaped airship which is aerodynamically stable and which will assume a level flight even in the presence of various wind currents which might temporarily effect level flight of the airship.

It is another object of this invention to provide a non-rigid lighter-than-air airship which will maintain a disc or saucer-like shape after inflation.

It is a further object of this invention to provide an airship which can be turned without the need for banking and which can execute turns over a very small area.

According to a preferred form of the invention, a lighter-than-air saucer-shaped non-rigid airship is provided wherein a saucer-shaped flexible envelope is provided within which an annular pressurized tube is positioned at an outer peripheral edge portion of the saucer-shaped envelope so as to maintain the saucer-shape when the envelope is inflated. Within the envelope a central chamber and an outer chamber system surrounding the central chamber is provided. In the central chamber heated air or a lifting gas is provided and in the outer chambers a lifting gas or heated air is also provided but wherein the lift provided in the outer chamber system is greater than the central chamber. With a load suspended beneath the central chamber, aerodynamic stability is attained for level or horizontal flight since the lifting force provided by the central chamber is less than the symmetrical force surrounding the central chamber.

In another form of the invention, a plurality of gas bags are provided surrounding the central chamber. Also, lifting gases such as helium may be provided throughout the airship and the use of hot air eliminated so long as a differential lift is created within the airship so as to maintain aerodynamic stability as explained above. Additionally, the lifting force provided by the central chamber might be greater than the lifting forces provided by the outer chambers and thus also achieve aerodynamic stability in this manner.

Although in the preferred form the balloon is in the shape of a "flying saucer", other shapes may be employed while still retaining the aerodynamic stability indicated previously.

Preferably the outer chamber system includes a plurality of chambers symmetrically disposed around the central chamber and during normal flight transfer of gas from one chamber to the other is prevented so that in the event of a temporary tilting of the airship gas will not flow from one side to the other. However, valves may be provided for selectively transferring gas from one chamber to another.

BRIEF DESCRIPTION OF THE DRAWINGS

FIG. 2 is a top view of the saucer-shaped airship of this invention;

FIG. 4 is an alternate embodiment of a frame supporting tube system at peripheral edges of the saucer-shaped airship of FIG. 1;

FIG. 5 is another alternate embodiment of the frame system of FIG. 4;

FIGS. 6, 7 and 8 are simplified side cross-sectional views illustrating various lifting gas arrangements in alternate embodiments of the invention; and FIG. 9 is a side view of the airship of this invention showing alternate embodiments employing stabilizing fins and pusher-type propulsion units.

DESCRIPTION OF THE PREFERRED EMBODIMENTS

Figure 1:
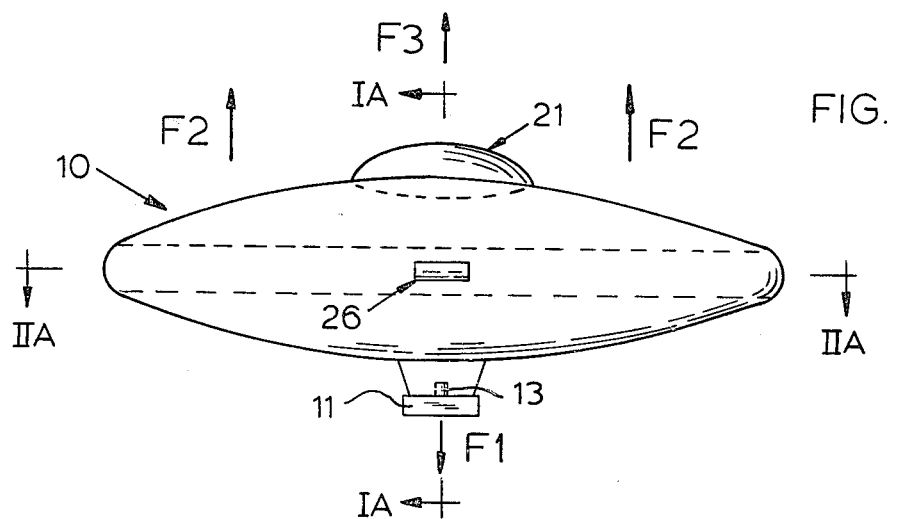
FIG. 1 is a perspective view of the improved airship of this invention.

As shown in FIG. 1, in accordance with the invention an improved non-rigid saucer-like shaped airship is provided generally indicated at 10. Preferably such an airship utilizes a lifting gas such as heated air, helium, or the like. The airship may support a load 11 such as a gondola carrying a pilot. A hot air generator 13 is preferably mounted on the gondola so as to direct a stream of heated air upwardly through an aperture 17 more clearly shown in FIG. 1A into the airship. Such hot air generators are well known and include propane burner systems.

Figure 1A:
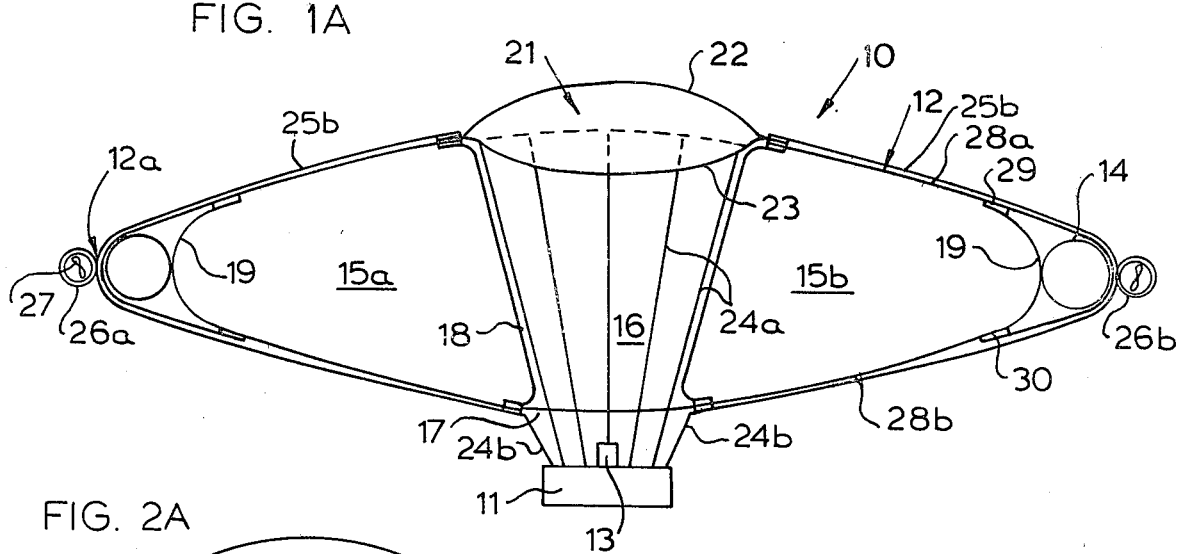
FIG. 1A is a cross-sectional view taken along line Ia—Ia of FIG. 1.
Figure 2A:
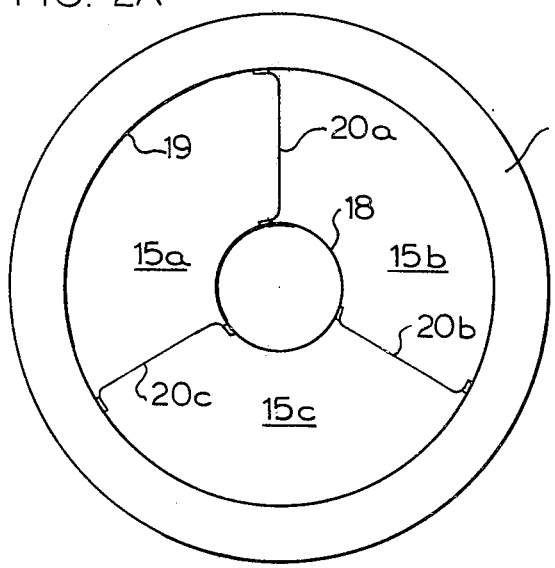
FIG. 2A is a simplified cross-sectional view showing placement of chamber dividing walls taken along line IIa—IIa of FIG. 1.

The airship is formed of an outer envelope 12 of saucer or disc-like shape and preferably comprising nylon or plastic materials such as used in hot air and gas balloons. In order to maintain the saucer-like shape, an annular pressurized tube 14 generally known as an "inner tube" shape is provided at an outer peripheral edge 12a of the airship. With the annular tube 14 positioned within the outer envelope 12 and pressurized with air or with helium, when the outer envelope 12 is inflated the saucer-shape is maintained since the annular tube 14 serves as a frame member. As shown in FIGS. 1A, 2, and 2A, the outer envelope 12 is comprised of a top envelope section 28a and a bottom envelope section 28b. A central or inner chamber is formed within the envelope 12 by providing an inner chamber wall 18 surrounding a vertical central axis of the airship. The inner chamber wall 18 is slanted so as to form an upside down truncated conical shaped central chamber 16 which approximates the shape of known hot air balloon designs. Exterior to the central chamber 16 a plurality of outer chambers 15a,b,c are distributed around the central chamber in symmetrical fashion. Preferably three or a multiple of three of such chambers are provided. These chambers 15a,b,c are formed by providing chamber dividing walls 20a,b,c which radially extend from the inner chamber wall 18 out towards the peripheral edge 12a of the airship. These dividing walls are provided in a symmetrical pattern such as shown in FIG. 2A so that the volumes of the outer chambers 15a,b,c will be substantially equal. An outer chamber wall 19 may be provided to segregate the annular tube 14 from each of the outer chambers or to provide a well defined sealed interior for each of the chambers 15a,b,c.

A dome chamber 21 is positioned above the central chamber 16 and provides a supporting roof above the central chamber 16. This chamber is formed of an upper wall 22 and a lower wall 23. Load cables 24a which are preferably nylon may extend from the top of the central chamber 16 down to the gondola 11 and additional load cables 24b may extend from the bottom of the outer envelope 12 adjacent the aperture 17 to the gondola.

To provide further envelope support and load lines for the gondola, an upper circular load tape 25a as shown in FIG. 2 may be provided around the dome 22. Longitudinal load tapes 25b extend around the outer envelope in a symmetrical pattern down to a lower circular load tape 25c around the aperture 17.

Propulsion units 26a,b are provided for movement of the airship during flight. These propulsion units are preferably placed at the peripheral edge 12a of the saucer-shaped airship and at opposite sides thereof. Each of these propulsion units may contain a small propeller 27 driven by a low horsepower electric motor.

As shown in FIG. 1A, the outer wall 19 may be an extension of the lower envelope section 28b which is sewn to the upper envelope section at 29. Similarly, the upper envelope section 28a may extend around the annular tube 14 so as to form the peripheral edge 12a and then be sewn to the lower envelope section 28b at 30.

In the preferred embodiment of the invention, the central chamber 16 is filled with heated air and the outer chambers 15a,b,c are filled with helium. Also, to insure adequate lift, it is preferable to pressurize the annular tube 14 with helium. When a load is applied such as the gondola 11, a downward force F1 is created as shown in FIG. 1. This force is balanced by the forces F2 plus F3. Horizontal equilibrium of the airship is maintained during flight since the symmetrical forces F2 surrounding the central axial force F3 are greater than F3. Consequently, if an air current temporarily tilts the airship, the airship will automatically reassume a horizontal flight plane. In other words, since the density of air decreases with increasing elevation above the ground, if a left side of the saucer tips upwardly the surrounding air will be less dense than at the right side of the airship where the air is more dense. Consequently, a differential will be created such that the lift on the right side of the airship will exceed the lift on the left side of the airship and bring the airship back to a horizontal equilibrium position. This horizontal aerodynamic stability is therefore achieved with the invention through a differential lift system contained within an outer envelope. Preferably there is no gas transfer between the outer chambers so that when one side of the airship is higher than the other there is no flow of gas to the higher portion of the airship. However, valves may be provided to selectively transfer gas to balance lift.

By filling the dome chamber 21 with helium, the top of the dome is self-supporting even without the addition of hot air. The dome may also be pressurized with air.

The altitude of the airship may be controlled by the temperature of the hot air within the central chamber 16, thus controlling the lift.

With the invention, in order to change the flight direction of the aircraft, it is not necessary to bank such as in prior art airship designs. Rather, one simply creates greater propulsion from one of the two propulsion units so as to rotate the saucer-shaped airship substantially about its vertical central axis and then resume level flight in the new direction by applying substantially equal thrusts from each of the propulsion units 26a,26b.

The aerodynamic characteristics of the airship are superior to previous designs due to the relatively small vertical height relative to the diameter of the airship.

Also, by providing the lower envelope section 28b continuous to the junction point 29, gas seepage is minimized.

Also, it is possible to provide the differential lift concepts of this invention in a non-rigid airship of shape other than circular although the circular shape provides the direction change advantages previously described.

Figure 3:
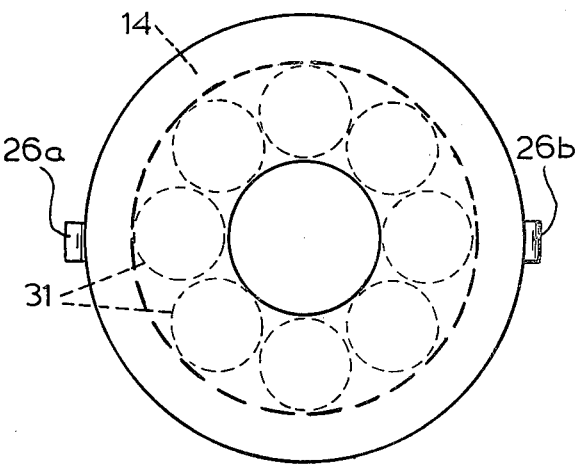
FIG. 3 is a top cross-sectional view of an alternate embodiment of the airship of FIG. 1.

Further embodiments of the invention are shown in FIGS. 3 through 9. In FIG. 3 rather than providing dividing walls in order to form the outer chambers, a plurality of closed lifting gas bags 31 are provided between the annular tube 14 and the central chamber 16. These bags 31 should be distributed substantially evenly around the central chamber 16 and are preferably filled with helium.

As shown in FIG. 4, rather than providing a single annular tube 14, three or more small annular tubes such as 32a, 32b and 32c may be provided in the triangular pattern such that one of the tubes 32a forms a narrow, sharp, aerodynamically smooth peripheral edge 33 for the airship.

As shown in FIG. 5, it is possible to eliminate the outer chamber wall 19 provided that the dividing walls and inner chamber wall 18 are provided for the formation of outer chambers.

As shown in FIG. 6, the central chamber may be heated with a hot air generator 35 while outer chambers may be heated with additional hot air generators 34a, 34b and 34c (not shown). Preferably the temperature T1 in the outer chambers exceeds the temperature T2 in a central chamber so as to create the differential lift aerodynamic stability described previously.

Alternatively as shown in FIG. 7, the temperature in the outer chambers may be less than the temperature in the central chamber so as to have a greater force in the center and lesser forces surrounding the central force. This arrangement will also result in aerodynamic stability through differential lift.

In FIG. 8 the central chamber 39 is filled with a lifting gas other than air such as helium whereas the outer chambers 40a,b,c are provided with heated air by use of hot air generators 38a,b,c. Here again the differential lift aerodynamic stability is achieved so long as the forces between the central chamber and the outer chambers differ.

Finally, in FIG. 9 the addition of a vertical stabilizing fin 36 is shown attached at one side of the airship and supported by a support cable 36a. Also, a pusher type propulsion unit 37 may be provided as an alternative or in addition to the propulsion units 26a,b previously described.

Although in the preferred embodiment of this invention a circular disc or saucer-shape is employed, the principle of differential lift for stability may also be employed with other shapes of airships such as a cigar shape in which case chambers with greater lift can be provided at the front and rear of the airship symmetrical to a central load so that the front and tail portions of the airship will remain in a substantially horizontal plane although such an arrangement may not maintain rotational stability about a longitudinal axis of the airship.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A non-rigid lighter-than-air airship employing differential lift for stabilization, comprising:
   a saucer-shaped envelope having a central chamber and a plurality of separate outer chambers symmetrically arranged around the central chamber;
   means supported below the central chamber of the envelope for generating heated air;
   a lighter-than-air medium other than heated air in the outer chambers and the central chamber having an opening in a bottom thereof dimensioned to permit heated air to enter from the means for generating heated air, the medium in the outer chambers providing a lifting force arranged symmetrically about the central chamber which is greater than that provided by the central chamber when filled with heated air;
   the other chambers being separate from one another so as to prevent shifting of the lighter-than-air medium when the saucer-shaped envelope is tilted relative to level flight; and
   the outer chambers being designed to provide the symmetrical lifting force so as to maintain the airship in a horizontal attitude as an equilibrium state to which the airship returns when deflected.

2. The non-rigid airship of claim 1 wherein an annular pressurized tube is positioned within the envelope along a circular periphery of the envelope to maintain a circular shape of the envelope.

3. The non-rigid airship of claim 1 wherein the plurality of outer chambers are provided by dividing walls extending from the central chamber to the outer periphery of the airship, said dividing walls being symmetrically arranged around the central chamber.

4. The non-rigid airship of claim 1 wherein propellors are arranged on opposite sides of the airship at a periphery thereof.

5. The non-rigid airship of claim 1 wherein a domed chamber closes the top of the central chamber.

6. A method for stabilizing a non-rigid airship by differential lift, comprising the steps of:
   providing an envelope having a central chamber with an opening at the bottom and a plurality of enclosed outer chambers arranged symmetrically about the central chamber in a horizontal plane;
   introducing heated air through the opening in the central chamber generated by a hot air generator suspended below the central chamber and providing a lighter-than-air medium other than heated air in each of the outer chambers;
   loading the airship below the central chamber; maintaining the airship in a horizontal attitude which is an equilibrium state to which the airship returns when deflected, said equilibrium state being a result of outer peripheral lift forces created by the outer chambers being symmetrically arranged about a lesser lift force created by the heated air in the central chamber; and
   preventing a shift of the medium in the outer chambers when the airship is tilted relative to level flight by providing the medium in said enclosed outer chambers which are separate from one another.

7. The method of claim 6 including the further step of maintaining a shape of the airship by pressurizing an annular tube within the envelope positioned along a circular periphery of the envelope.

8. A non-rigid lighter-than-air airship employing differential lift for stabilization, comprising:
   a circular saucer-shaped envelope having a central chamber and a plurality of separate equal volume outer chambers symmetrically arranged around the central chamber;
   a load supported below the central chamber of the envelope;
   a same lifting gas provided in all of the outer chambers and also a lifting gas in the central chamber, the lifting gas in all the outer chambers providing a total lifting force arranged symmetrically about the central chamber which is greater than that provided by the lifting gas in said central chamber;
   the outer chambers of equal volume being separate from one another so as to prevent shifting of the lifting gas therein when the saucer-shaped envelope is tilted relative to level flight; and
   the outer chambers being designed to provide the symmetrical lifting force so as to maintain the airship in a horizontal attitude as an equilibrium state to which the airship returns when deflected.

* * * * *